United States Patent
Werth et al.

(10) Patent No.: US 10,989,566 B2
(45) Date of Patent: Apr. 27, 2021

(54) MAGNETIC SENSOR SYSTEM FOR MEASURING LINEAR POSITION

(71) Applicant: Infineon Technologies AG, Neubiberg (DE)

(72) Inventors: Tobias Werth, Villach (AT); Robert Hermann, Voelkermarkt (AT)

(73) Assignee: Infineon Technologies AG, Neubiberg (DE)

( * ) Notice: Subject to any disclaimer, the term of this patent is extended or adjusted under 35 U.S.C. 154(b) by 373 days.

(21) Appl. No.: 15/948,724

(22) Filed: Apr. 9, 2018

(65) Prior Publication Data
US 2019/0310111 A1 Oct. 10, 2019

(51) Int. Cl.
G01D 5/243 (2006.01)
G01R 1/00 (2006.01)
G01B 1/00 (2006.01)

(52) U.S. Cl.
CPC ................... *G01D 5/243* (2013.01)

(58) Field of Classification Search
CPC .... B60R 1/00; G01R 1/00; G01B 1/00; G01B 2210/00; G01D 1/00
See application file for complete search history.

(56) References Cited

U.S. PATENT DOCUMENTS

| | | | |
|---|---|---|---|
| 2002/0190710 A1* | 12/2002 | Steinich | G01D 5/2457 324/207.24 |
| 2007/0103343 A1 | 5/2007 | Recio et al. | |
| 2010/0072988 A1* | 3/2010 | Hammerschmidt | G01R 33/093 324/207.25 |
| 2014/0253106 A1* | 9/2014 | Granig | G01D 5/165 324/207.14 |
| 2015/0077093 A1 | 3/2015 | Saito et al. | |
| 2015/0177337 A1* | 6/2015 | Yamashita | H01L 43/08 324/252 |
| 2016/0223594 A1* | 8/2016 | Suzuki | G01R 15/20 |
| 2017/0276740 A1 | 9/2017 | Schmitt et al. | |
| 2017/0307416 A1* | 10/2017 | Tsukamoto | G01D 5/245 |

FOREIGN PATENT DOCUMENTS

| | | |
|---|---|---|
| CN | 106767956 | 2/2017 |
| EP | 0042179 | 6/1981 |
| JP | S6073415 | 9/1983 |

* cited by examiner

*Primary Examiner* — Jermele M Hollington
*Assistant Examiner* — Temilade S Rhodes-Vivour
(74) *Attorney, Agent, or Firm* — Harrity & Harrity, LLP

(57) ABSTRACT

A magnetic sensor system may include a first magnetic sensor and a second magnetic sensor. The first magnetic sensor may include a first triplet of sensor elements for measuring a magnetic field. The first triplet of sensor elements may be aligned linearly along a direction of movement. A first pair of differential signals, output by the first magnetic sensor, may indicate a position of the magnetic sensor system, along the direction of movement, relative to a magnetic pole pair. The second magnetic sensor may include a second triplet of sensor elements for measuring the magnetic field. The second triplet of sensor elements may be aligned linearly along the direction of movement. The second magnetic sensor may be positioned relative to the first magnetic sensor such that a second pair of differential signals, output by the second magnetic sensor, indicates a position of the magnetic sensor system across multiple pole pairs.

20 Claims, 5 Drawing Sheets

MAGNETIC SENSOR SYSTEM FOR MEASURING LINEAR POSITION

BACKGROUND

A magnetic sensor may be used to measure magnetism, such as the direction, strength, or relative change of the magnetic field at a particular location. Such information can be used in a variety of applications, and sensed magnetic parameters can be used to control electronic systems.

SUMMARY

According to some possible implementations, a magnetic sensor system may include a first magnetic sensor and a second magnetic sensor. The first magnetic sensor may have a first sensor element, a second sensor element, and a third sensor element for measuring a magnetic field, and the first sensor element, the second sensor element, and the third sensor element may be aligned linearly along a direction of movement. A first pair of differential signals, output by the first magnetic sensor, may indicate a position of the magnetic sensor system, along the direction of movement, relative to a magnetic pole pair. The second magnetic sensor may have a fourth sensor element, a fifth sensor element, and a sixth sensor element for measuring the magnetic field, and the fourth sensor element, the fifth sensor element, and the sixth sensor element may be aligned linearly along the direction of movement. The second magnetic sensor may be positioned relative to the first magnetic sensor such that a second pair of differential signals, output by the second magnetic sensor, indicates a position of the magnetic sensor system across multiple pole pairs.

According to some possible implementations, a method may be performed by a magnetic sensor system. The method may include generating a first pair of differential signals that indicate a first linear position of the magnetic sensor system relative to a magnetic pole pair that generates a magnetic field measured by the magnetic sensor system. The method may include generating a second pair of differential signals that indicate a second linear position of the magnetic sensor system relative to a series of magnetic pole pairs that include the magnetic pole pair. The method may include outputting the first pair of differential signals and the second pair of differential signals to permit determination of the second linear position of the magnetic sensor system relative to the series of magnetic pole pairs.

According to some possible implementations, a system for position determination may include a first magnetic sensor and a second magnetic sensor. The first magnetic sensor may include a first set of magnetic sensor elements aligned linearly along a direction of movement of the first magnetic sensor relative to a magnetic pole pair. The first magnetic sensor may be configured to generate a first pair of differential signals based on measurements from the first set of magnetic sensor elements, and to output the first pair of differential signals. The second magnetic sensor may include a second set of magnetic sensor elements aligned linearly along the direction of movement. The second magnetic sensor may be configured to generate a second pair of differential signals based on measurements from the second set of magnetic sensor elements, and to output the second pair of differential signals. The first magnetic sensor and the second magnetic sensor may be positioned relative to one another to permit a position, along a series of magnetic pole pairs that include the magnetic pole pair, to be determined using the first pair of differential signals and the second pair of differential signals.

DETAILED DESCRIPTION

The following detailed description of example implementations refers to the accompanying drawings. The same reference numbers in different drawings may identify the same or similar elements.

When a magnetic sensor is used to determine a position of a moving mechanical part controlled by a motor, the magnetic sensor may not be robust against magnetic disturbances caused by the motor. For example, a magnetic sensor may be used to determine a position of a seat in the vehicle, a window of the vehicle, a door of the vehicle, and/or the like. If the movement of such a mechanical part is controlled by a motor, then operation of the motor may generate a magnetic field, which may cause a measurement error in a magnetic sensor that measures magnetic field components to determine a position of the mechanical part. Some implementations described herein increase the robustness of a magnetic sensor system used to determine a position of a mechanical part.

Figure 1:
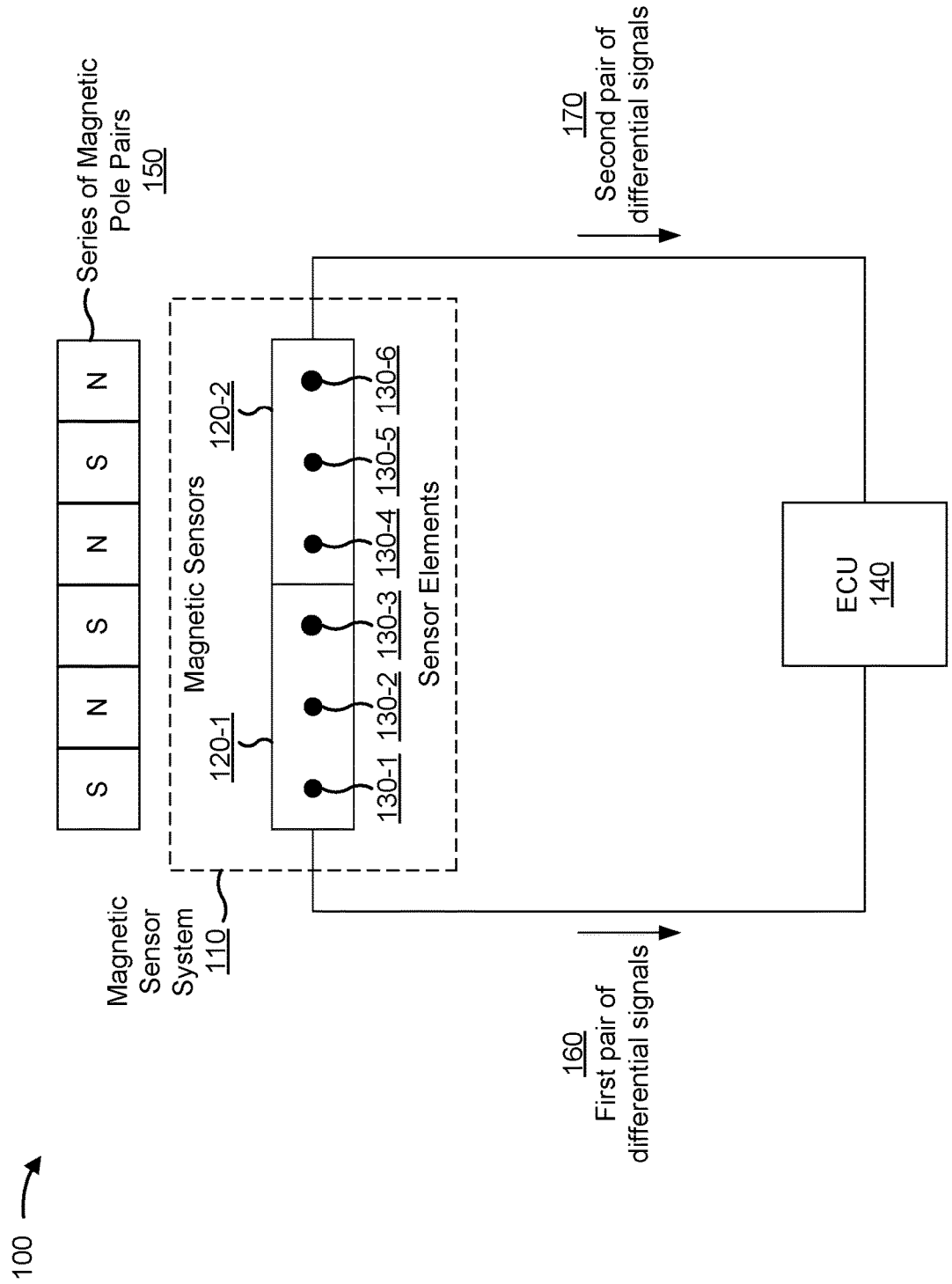
FIG. 1 is a diagram of an example magnetic sensor system for measuring linear position, according to some implementations described herein.

FIG. 1 is a diagram of an example 100 of a magnetic sensor system for measuring linear position, according to some implementations described herein.

As shown in FIG. 1, a magnetic sensor system 110 may include a first magnetic sensor 120-1 and a second magnetic sensor 120-2. As further shown, the first magnetic sensor 120-1 may include a first magnetic sensor element 130-1, a second magnetic sensor element 130-2, and a third magnetic sensor element 130-3, and the second magnetic sensor 120-2 may include a fourth magnetic sensor element 130-4, a fifth magnetic sensor element 130-5, and a sixth magnetic sensor element 130-6. A magnetic sensor element 130 may be referred to as a sensor element 130 in some instances herein. In some implementations, the first magnetic sensor 120-1 and the second magnetic sensor 120-2 are on a same die or package. In some implementations, the first magnetic sensor 120-1 and the second magnetic sensor 120-2 are on different dies or packages (e.g., a corresponding first die or first package and second die or second package). As further shown, the magnetic sensors 120 may communicate with an electronic control unit (ECU) 140, such as via a wired connection, a wireless connection, or a combination of wired and wireless connections.

The sensor elements 130 of the magnetic sensors 120 may be used to measure a magnetic field generated by a series of magnetic pole pairs 150 (e.g., multiple alternating North and South pole pairs), which may be arranged on a multi-pole magnetic strip (as shown), a multi-pole magnetic ring, a magnetic pole wheel, a sequence of alternating magnets, and/or the like. In some implementations, the first magnetic sensor 120-1 and the second magnetic sensor 120-2 may be positioned on a same side of the series of magnetic pole pairs 150 (e.g., on a same side of a magnetic strip), as shown.

As shown in FIG. 1, the set (e.g., triplet) of sensor elements 130 of the first magnetic sensor 120-1 (e.g., the first sensor element 130-1, the second sensor element 130-2, and the third sensor element 130-3) may be linearly aligned. For example, the set of sensor elements 130 of the first magnetic sensor 120-1 may be linearly aligned along a direction of movement along which a position is to be determined using measurements of the magnetic sensor system 110 (e.g., a position of the magnetic sensor system along a magnetic strip and/or the like). Additionally, or alternatively, the second sensor element 130-2 (e.g., a sensor element 130 positioned in the middle of a triplet of sensor elements 130) may be substantially centered (e.g., within a tolerance limit) between the first sensor element 130-1 and the third sensor element 130-3. In this arrangement, the first magnetic sensor 120-1 may determine and/or generate a first pair of differential signals 160 based on measurements of the sensor elements 130-1, 130-2, and 130-3. The first pair of differential signals 160 may be phase shifted by substantially 90 degrees (e.g., within a tolerance limit) with respect to one another, and may be robust against magnetic disturbances.

For example, the first pair of differential signals 160 may be generated based on a first measurement A of a magnetic field by the first sensor element 130-1, which may be represented as $A=\sin(\omega t)$ (e.g., where $\omega$ represents frequency and $t$ represents time), a second measurement B of the magnetic field by the second sensor element 130-2, which may be represented as $B=\sin(\omega t+p)$ (e.g., where $p$ represents phase), and a third measurement C of the magnetic field by the third sensor element 130-3, which may be represented as $C=\sin(\omega t+2p)$. A first value S of the first pair of differential signals 160 may be calculated as $S=A-C=-2\times\sin(p)\times\cos(\omega t+p)$, and a second value D of the first pair of differential signals 160 may be calculated as $D=A+C-2B=2\times[\cos(p)-1]\times\sin(\omega t+p)$. The first pair of differential signals 160 may be used to determine a linear position of the first magnetic sensor 120-1, along the direction of movement, relative to a single magnetic pole pair. For example, the linear position may be represented as a phase P between two zero crossings that represent opposite ends of the single magnetic pole pair, and may be calculated using an arctangent or cordic function, such as $P=\operatorname{atan}(S/D\times \text{amplitude}_{correction})$, where $\text{amplitude}_{correction}$ represents an amplitude ratio between S and D.

Similarly, and as further shown in FIG. 1, the set (e.g., triplet) of sensor elements 130 of the second magnetic sensor 120-2 (e.g., the fourth sensor element 130-4, the fifth sensor element 130-5, and the sixth sensor element 130-6) may be linearly aligned. For example, the set of sensor elements 130 of the second magnetic sensor 120-2 may be linearly aligned along a direction of movement along which a position is to be determined using measurements of the magnetic sensor system 110. Additionally, or alternatively, the fifth sensor element 130-5 (e.g., a sensor element 130 positioned in the middle of a triplet of sensor elements 130) may be substantially centered (e.g., within a tolerance limit) between the fourth sensor element 130-4 and the sixth sensor element 130-6. In this arrangement, the second magnetic sensor 120-2 may determine and/or generate a second pair of differential signals 170 based on measurements of the sensor elements 130-4, 130-5, and 130-6. The second pair of differential signals 170 may be phase shifted by 90 degrees (e.g., within a tolerance limit) with respect to one another, and may be robust against magnetic disturbances. For example, the second pair of differential signals 170 and a corresponding position may be determined in a similar manner as described above.

In some implementations, the first pair of differential signals 160 may indicate a first linear position of the magnetic sensor system 110, along the direction of movement, relative to a single magnetic pole pair (e.g., a single North-South pole pair). The first pair of differential signals 160 may not indicate a second linear position of the magnetic sensor system 110, along the direction of movement, relative to the series of magnetic pole pairs 150 (e.g., an absolute position along a magnetic strip). However, the first magnetic sensor 120-1 and the second magnetic sensor 120-2 may be positioned relative to one another such that the second linear position of the magnetic sensor system 110 along the series of magnetic pole pairs 150 may be indicated and/or determined using the first pair of differential signals 160 and the second pair of differential signals 170, as described in more detail below in connection with FIG. 2. For example, the first magnetic sensor 120-1 and the second magnetic sensor 120-2 may be aligned linearly along a same axis, such that the sensor elements 130-1, 130-2, 130-3, 130-4, 130-5, and 130-6 are all linearly aligned along the direction of movement, as shown in FIG. 1.

In some implementations, the first pair of differential signals 160 and the second pair of differential signals 170 may be output to the ECU 140. In this case, the ECU 140 may determine a position of the magnetic sensor system 110 relative to the series of magnetic pole pairs 150 using the first pair of differential signals 160 and the second pair of differential signals 170. In some implementations, the position may represent an absolute position relative to a first end position and a second end position (e.g., opposite ends of the series of magnetic pole pairs 150). In some implementations, the first end position and the second end position may be stored in memory.

In some implementations, the ECU 140 may store a lookup table in memory, and may look up the position using values of the first and second pairs of differential signals 160, 170. In some implementations, the ECU 140 may store the position in memory so that a mechanical part (e.g., a seat, a window, a door, and/or the like) can later be moved to the position. Additionally, or alternatively, the ECU 140 may compare the position to a position stored in memory, and may output one or more control signals based on the comparison (e.g., to move a mechanical part to the position stored in memory).

Additionally, or alternatively, the magnetic sensor system 110 may include one or more processors to determine a position of the magnetic sensor system 110 relative to the series of magnetic pole pairs 150 using the first pair of differential signals 160 and the second pair of differential signals 170, in a similar manner as described above. In this case, the magnetic sensor system 110 may perform one or more operations described above as being performed by the ECU 140.

As indicated above, FIG. 1 is provided as an example. Other examples are possible and may differ from what was described with regard to FIG. 1.

Figure 2:
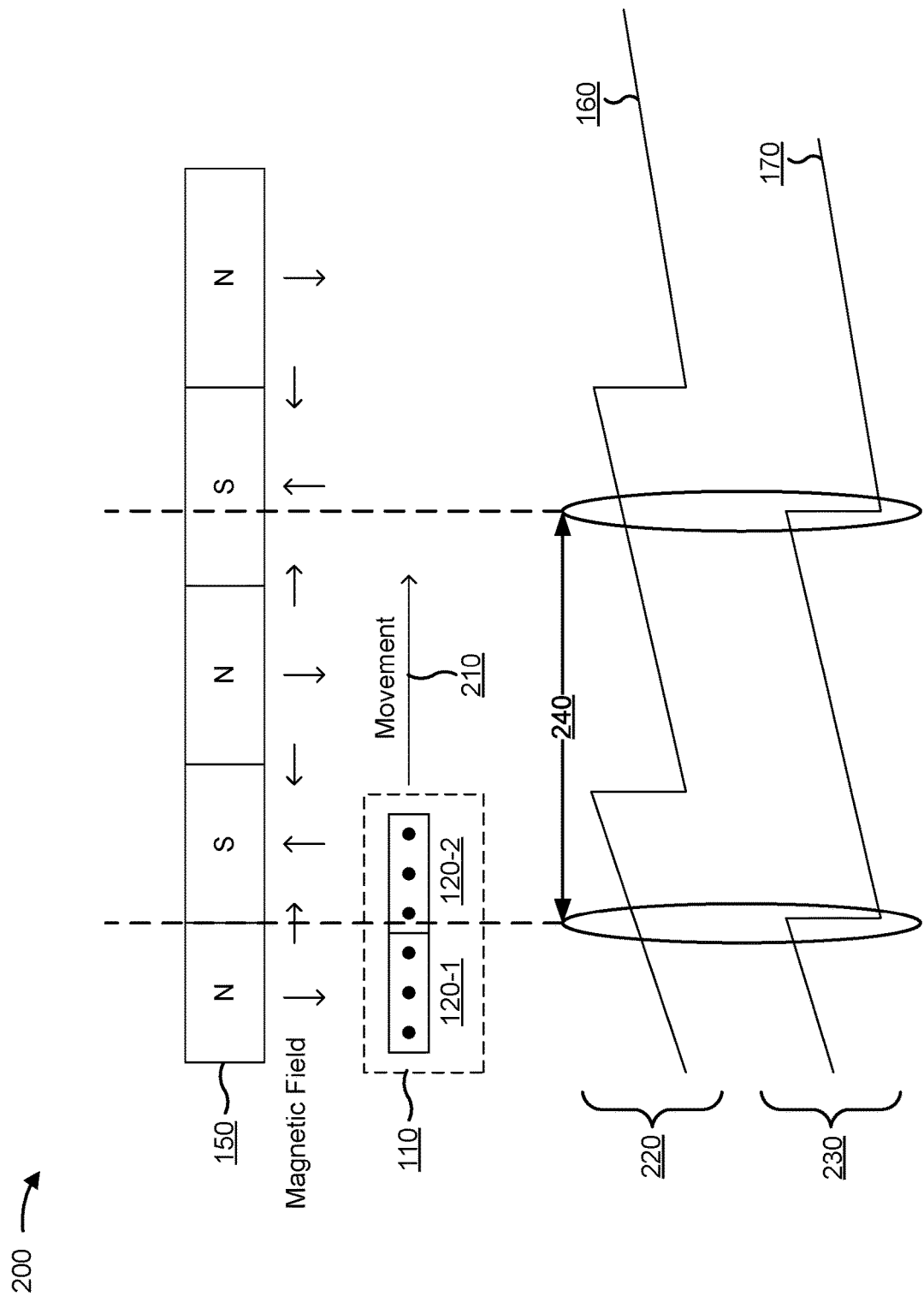
FIG. 2 is a diagram of an example of measuring linear position using the magnetic sensor system described herein.

FIG. 2 is a diagram of an example 200 of measuring linear position using the magnetic sensor system 110.

As shown in FIG. 2, and by reference number 210, the magnetic sensor system 110 may move relative to a series of magnetic pole pairs 150, such as a magnetic strip. As shown, in some implementations, the first magnetic sensor 120-1 and the second magnetic sensor 120-2 may be positioned on a same side of the magnetic strip. As shown, a size of each magnetic pole on the magnetic strip may increase along the strip (e.g., from one pole to the next adjacent pole, or from one pole pair to the next adjacent pole pair).

As shown by reference number 220, the first pair of differential signals 160 may be used to determine a first angle, which may correspond to a position of the first magnetic sensor 120-1 relative to a single magnetic pole pair (e.g., between opposite ends of the single magnetic pole pair) of the series of magnetic pole pairs 150. As shown by reference number 230, the second pair of differential signals 170 may be used to determine a second angle, which may correspond to a position of the second magnetic sensor 120-2 relative to a single magnetic pole pair (e.g., between opposite ends of the single magnetic pole pair) of the series of magnetic pole pairs 150.

As shown by reference number 240, different combinations of values of the first pair of differential signals 160 and the second pair of differential signals 170 may correspond to different positions along the series of magnetic pole pairs 150. Thus, by using a lookup table and/or a function stored in memory, the magnetic sensor system 110 and/or the ECU 140 can determine an absolute position of the magnetic sensor system 110 along the series of magnetic pole pairs 150 using a first angle determined based on the first pair of differential signals 160 and a second angle determined based on the second pair of differential signals 170.

As indicated above, FIG. 2 is provided as an example. Other examples are possible and may differ from what was described with regard to FIG. 2.

Figure 3:
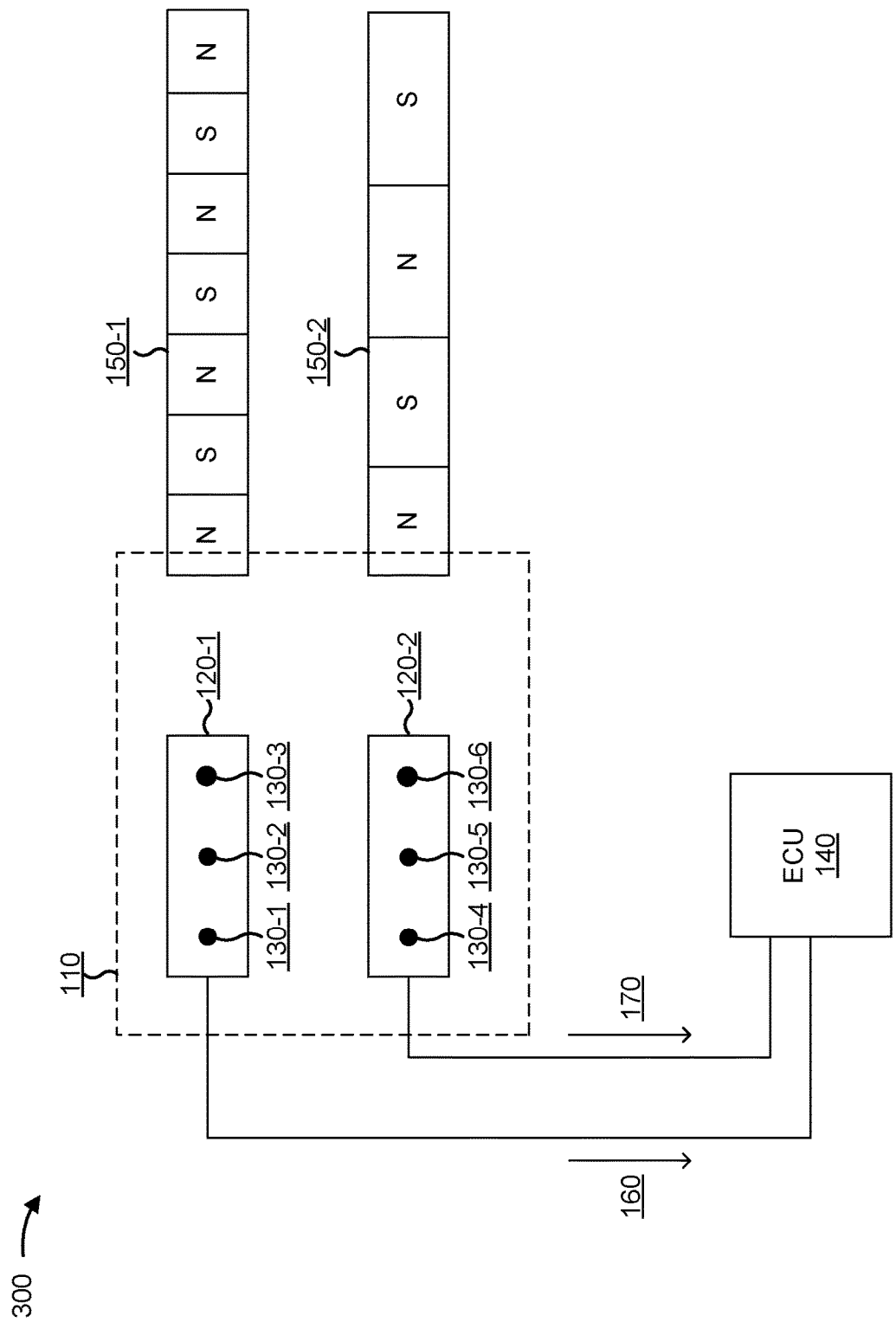
FIG. 3 is a diagram of another example magnetic sensor system for measuring linear position, according to some implementations described herein.

FIG. 3 is a diagram of another example 300 of a magnetic sensor system for measuring linear position, according to some implementations described herein. As shown in FIG. 3, the magnetic sensor system 110 may have a different arrangement or configuration than shown in FIG. 1.

For example, the sensor elements 130 of the first magnetic sensor 120-1 may be linearly aligned along a first axis, and the sensor elements 130 of the second magnetic sensor 120-2 may be linearly aligned along a second axis. As shown, the first axis and the second axis may be substantially parallel (e.g., within a tolerance threshold). The sensor elements 130 of the magnetic sensors 120 may be used to measure a magnetic field generated by a first series of magnetic pole pairs 150-1 and a second series of magnetic pole pairs 150-2. In some implementations, the first magnetic sensor 120-1 is positioned to move linearly relative to (e.g., along) the first series of magnetic pole pairs 150-1, and the second magnetic sensor 120-2 is positioned to move linearly relative to (e.g., along) the second series of magnetic pole pairs 150-2.

As shown, a size of each magnetic pole on the first series of magnetic pole pairs 150-1 may be substantially the same (e.g., within a tolerance), and a size of each magnetic pole on the second series of magnetic pole pairs 150-2 may increase along the series (e.g., from one pole to the next adjacent pole). Although FIG. 2 shows two magnetic strips, in some implementations, the series of magnetic pole pairs 150 may be arranged as a first series of magnetic pole pairs 150-1 on a first side of a magnetic strip and a second series of magnetic pole pairs 150-2 on a second side (e.g., the opposite side from the first side) of the magnetic strip. In this case, the first magnetic sensor 120-1 may be positioned on the first side of the magnetic strip, and the second magnetic sensor 120-2 may be positioned on the second side of the magnetic strip.

In this arrangement, the first magnetic sensor 120-1 may generate and/or output a first pair of differential signals 160, and the second magnetic sensor 120-2 may generate and/or output a second pair of differential signals 170, in a similar manner as described above. The first and second pairs of differential signals 160, 170 may be used (e.g., by the magnetic sensor system 110 and/or the ECU 140) to determine an absolute linear position of the magnetic sensor system 110 along the first and/or second series of magnetic pole pairs 150-1, 150-2, in a similar manner as described above.

As indicated above, FIG. 3 is provided as an example. Other examples are possible and may differ from what was described with regard to FIG. 3.

Figure 4:
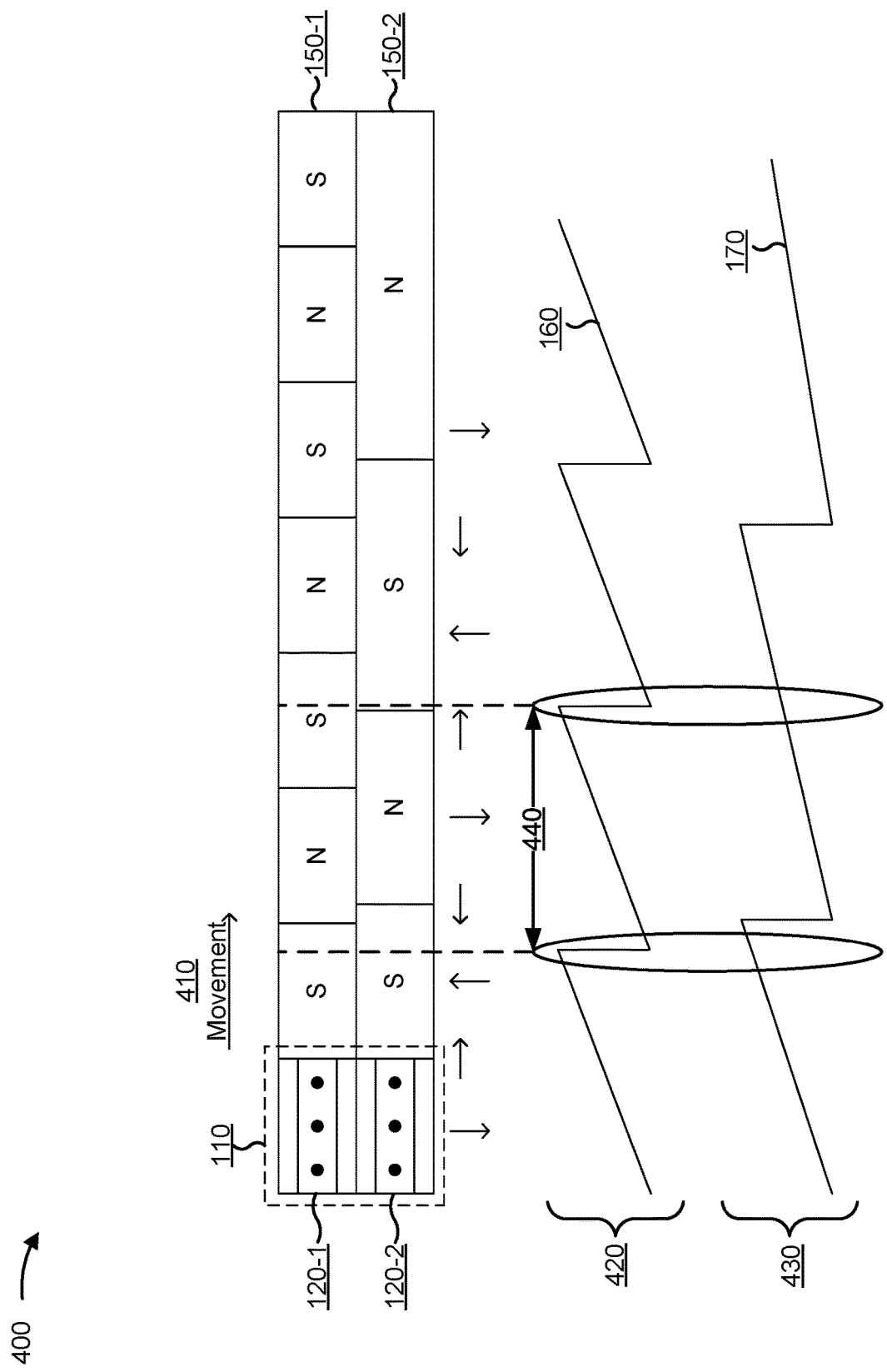
FIG. 4 is a diagram of another example of measuring linear position using the magnetic sensor system described herein.

FIG. 4 is a diagram of another example 400 of measuring linear position using the magnetic sensor system 110.

As shown in FIG. 4, and by reference number 410, the magnetic sensor system 110 may move relative to a first series of magnetic pole pairs 150-1, such as a first magnetic strip, and a second series of magnetic pole pairs 150-2, such as a second magnetic strip. As shown, in some implementations, the first magnetic sensor 120-1 and the second magnetic sensor 120-2 may be positioned on a same side of the magnetic strips. However, in some implementations, the first magnetic sensor 120-1 and the second magnetic sensor 120-2 may be positioned on opposite sides of a single magnetic strip. In some implementations, the opposite sides may have different magnetic patterns (e.g., as shown in FIGS. 3 and 4). As shown, each magnetic pole on the first magnetic strip may be substantially the same size (e.g., within a tolerance limit). Additionally, or alternatively, a size of each magnetic pole on the second magnetic strip may increase along the strip (e.g., from one pole to the next adjacent pole, or from one pole pair to the next adjacent pole pair).

As shown by reference number 420, the first pair of differential signals 160 may be used to determine a first angle, which may correspond to a position of the first magnetic sensor 120-1 relative to a single magnetic pole pair (e.g., between opposite ends of the single magnetic pole pair) of the first series of magnetic pole pairs 150-1. As shown by reference number 430, the second pair of differential signals 170 may be used to determine a second angle, which may correspond to a position of the second magnetic sensor 120-2 relative to a single magnetic pole pair (e.g., between opposite ends of the single magnetic pole pair) of the second series of magnetic pole pairs 150-2.

As shown by reference number 440, different combinations of values of the first pair of differential signals 160 and the second pair of differential signals 170 may correspond to different positions along the first series of magnetic pole pairs 150-1 and/or the second series of magnetic pole pairs 150-2. Thus, by using a lookup table and/or a function stored in memory, the magnetic sensor system 110 and/or the ECU 140 can determine an absolute position of the magnetic sensor system 110 along the series of magnetic pole pairs 150-1, 150-2 using a first angle determined based on the first pair of differential signals 160 and a second angle determined based on the second pair of differential signals 170.

As indicated above, FIG. 4 is provided as an example. Other examples are possible and may differ from what was described with regard to FIG. 4.

Figure 5:
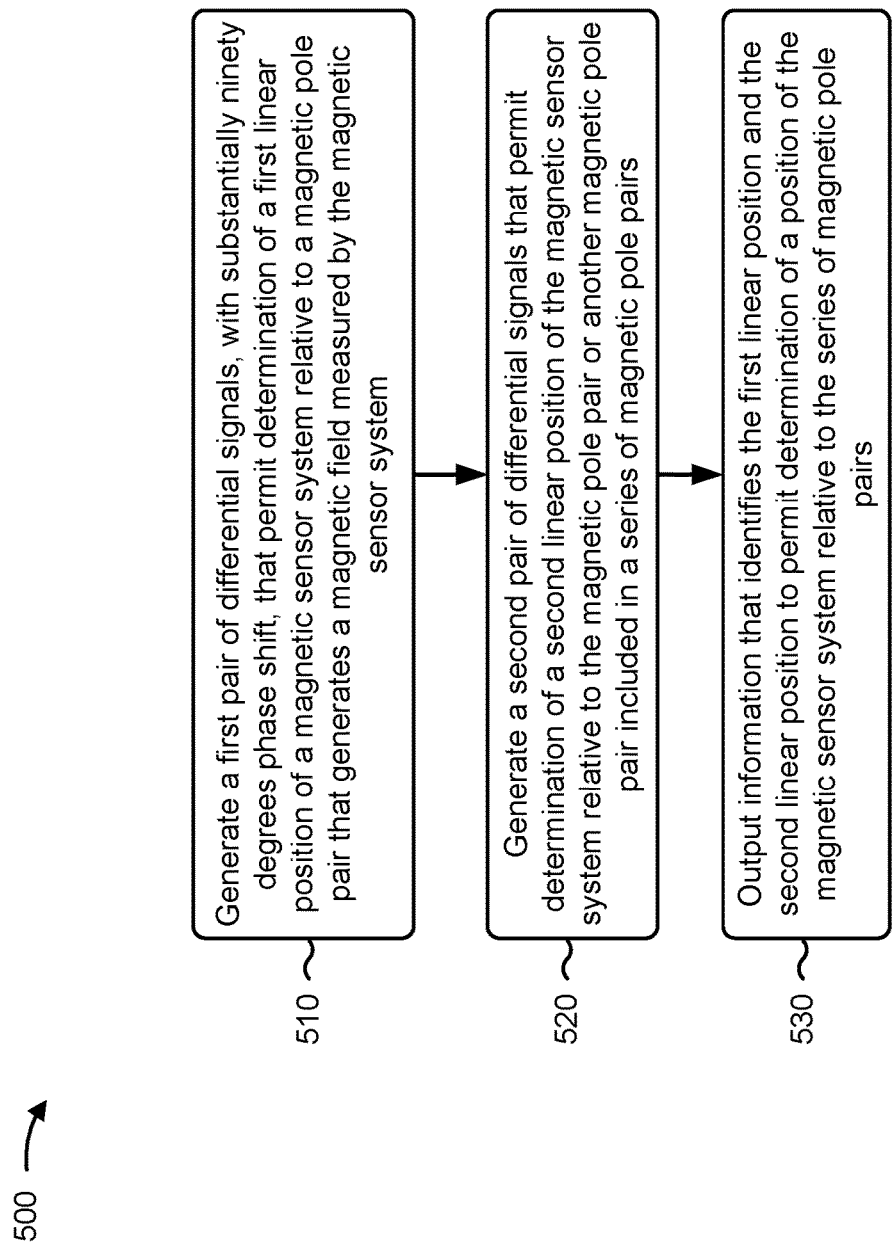
FIG. 5 is a flow chart of an example process for measuring linear position using a magnetic sensor system described herein.

FIG. 5 is a flow chart of an example process 500 for measuring linear position, according to some implementations described herein. In some implementations, one or more process blocks of FIG. 5 may be performed by the magnetic sensor system 110 (e.g., one or more magnetic sensors 120 and/or one or more magnetic sensor elements 130) and/or the ECU 140.

As shown in FIG. 5, process 500 may include generating a first pair of differential signals, with substantially ninety degrees phase shift, that permit determination of a first linear position of the magnetic sensor system relative to a magnetic pole pair that generates a magnetic field measured by the magnetic sensor system (block 510). For example, the magnetic sensor system (e.g., using the first magnetic sensor 120-1, the first set of magnetic sensor elements 130-1, 130-2, 130-3, and/or the like) may generate a first pair of differential signals, with substantially ninety degrees phase shift, that permit determination of a first linear position of the magnetic sensor system relative to a magnetic pole pair that generates a magnetic field measured by the magnetic sensor system, as described above in connection with FIGS. 1-4.

As further shown in FIG. 5, process 500 may include generating a second pair of differential signals that permit determination of a second linear position of the magnetic sensor system relative to the magnetic pole pair or another magnetic pole pair included in a series of magnetic pole pairs (block 520). For example, the magnetic sensor system (e.g., using the second magnetic sensor 120-2, the second set of magnetic sensor elements 130-4, 130-5, 130-6, and/or the like) may generate a second pair of differential signals that permit determination of a second linear position of the magnetic sensor system relative to the magnetic pole pair or another magnetic pole pair included in a series of magnetic pole pairs, as described above in connection with FIGS. 1-4.

As further shown in FIG. 5, process 500 may include outputting information that identifies the first linear position and the second linear position to permit determination of a position of the magnetic sensor system relative to the series of magnetic pole pairs (block 530). For example, the magnetic sensor system (e.g., using one or more processors, a communication interface, and/or the like) may output information that identifies the first linear position and the second linear position to permit determination of a position of the magnetic sensor system relative to the series of magnetic pole pairs, as described above in connection with FIGS. 1-4.

In some implementations, process 500 may include additional aspects, such as one or more aspects described below and/or elsewhere herein.

In some implementations, the first pair of differential signals is generated using a first triplet of sensor elements aligned along a direction of movement of the magnetic sensor system relative to the magnetic pole pair. Additionally, or alternatively, the second pair of differential signals is generated using a second triplet of sensor elements aligned along the direction of movement. In some implementations, the information that identifies the first linear position and the second linear position is output to at least one of: one or more processors of the magnetic sensor system, or an electronic control unit. In some implementations, the position of the magnetic sensor system relative to the series of magnetic pole pairs is determined by performing a lookup using at least one of: the first pair of differential signals and the second pair of differential signals, or the first linear position and the second linear position. In some implementations, the position of the magnetic sensor system relative to the series of magnetic pole pairs is determined relative to a first end of the series of magnetic pole pairs and a second end of the series of magnetic pole pairs.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

By using two magnetic sensors 120 and a Vernier principle applied to two corresponding pairs of differential signals output by the two magnetic sensors 120, an absolute position of a magnetic sensor system 110 along a series of magnetic pole pairs 150 may be determined. Furthermore, the magnetic sensor system 110 may be robust against magnetic disturbances, such as magnetic disturbances generated in connection with moving the magnetic sensor system 110 and the series of magnetic pole pairs 150 relative to one another.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic sensor system, comprising:
 a first magnetic sensor having a first sensor element, a second sensor element, and a third sensor element for measuring a magnetic field,
  wherein the first sensor element, the second sensor element, and the third sensor element are aligned linearly along a direction of movement,
  wherein a first pair of differential signals, output by the first magnetic sensor, indicates a position of the first magnetic sensor, along the direction of movement, relative to a single magnetic pole pair,
wherein the first pair of differential signals are phase shifted by substantially ninety degrees, and
wherein the position of the first magnetic sensor is calculated based on a first angle of the first pair of differential signals; and
a second magnetic sensor having a fourth sensor element, a fifth sensor element, and a sixth sensor element for measuring the magnetic field,
wherein the fourth sensor element, the fifth sensor element, and the sixth sensor element are aligned linearly along the direction of movement,
wherein a position of the second magnetic sensor relative to a single magnetic pole pair is calculated based on a second angle of a second pair of differential signals output by the second magnetic sensor, and
wherein in a combination of values of the first pair of differential signals and the second pair of differential signals indicate a position of the magnetic sensor system across multiple pole pairs.

2. The magnetic sensor system of claim 1, wherein the second sensor element is substantially centered between the first sensor element and the third sensor element, and wherein the fifth sensor element is substantially centered between the fourth sensor element and the sixth sensor element.

3. The magnetic sensor system of claim 1, wherein the first sensor element, the second sensor element, the third sensor element, the fourth sensor element, the fifth sensor element, and the sixth sensor element are aligned linearly along the direction of movement.

4. The magnetic sensor system of claim 1, wherein the first sensor element, the second sensor element, and the third sensor element are aligned linearly along a first axis,
wherein the fourth sensor element, the fifth sensor element, and the sixth sensor element are aligned linearly along a second axis,
wherein the second axis is parallel to the first axis.

5. The magnetic sensor system of claim 1, wherein the first magnetic sensor and the second magnetic sensor are positioned on opposite sides of a magnetic strip that has different magnetic patterns on the opposite sides.

6. The magnetic sensor system of claim 1, wherein the first magnetic sensor and the second magnetic sensor are positioned on a same side of a magnetic strip.

7. The magnetic sensor system of claim 1, wherein the first magnetic sensor is positioned to move linearly relative to a first magnetic strip and the second magnetic sensor is positioned to move linearly relative to a second magnetic strip.

8. The magnetic sensor system of claim 1, wherein the first magnetic sensor and the second magnetic sensor are on a same die or package.

9. The magnetic sensor system of claim 1, wherein the first magnetic sensor is on a first die or first package and the second magnetic sensor is on a second die or second package.

10. The magnetic sensor system of claim 1, further comprising one or more processors to determine a position of the magnetic sensor system, relative to a first end position and a second end position, based on the first pair of differential signals and the second pair of differential signals.

11. The magnetic sensor system of claim 1, wherein the first pair of differential signals and the second pair of differential signals are output to an electronic control unit (ECU) to cause the ECU to determine a position of the magnetic sensor system.

12. A method performed by a magnetic sensor system, comprising:
generating a first pair of differential signals, with substantially ninety degrees phase shift, that permit determination of a first linear position of a first magnetic sensor of the magnetic sensor system relative to a magnetic pole pair that generates a magnetic field measured by the magnetic sensor system,
wherein the first linear position is determined based on a first angle of the first pair of differential signals;
generating a second pair of differential signals that permit determination of a second linear position of a second magnetic sensor of the magnetic sensor system relative to the magnetic pole pair or another magnetic pole pair included in a series of magnetic pole pairs,
wherein the second linear position is determined based on a second angle of the second pair of differential signals; and
outputting information that identifies the first linear position and the second linear position to permit determination of a position of the magnetic sensor system relative to the series of magnetic pole pairs.

13. The method of claim 12, wherein the first pair of differential signals is generated using a first triplet of sensor elements aligned along a direction of movement of the magnetic sensor system relative to the magnetic pole pair, and
wherein the second pair of differential signals is generated using a second triplet of sensor elements aligned along the direction of movement.

14. The method of claim 12, wherein the information that identifies the first linear position and the second linear position is output to at least one of:
one or more processors of the magnetic sensor system, or
an electronic control unit.

15. The method of claim 12, wherein the position of the magnetic sensor system relative to the series of magnetic pole pairs is determined by performing a lookup using at least one of:
the first pair of differential signals and the second pair of differential signals, or
the first linear position and the second linear position.

16. The method of claim 12, wherein the position of the magnetic sensor system relative to the series of magnetic pole pairs is determined relative to a first end of the series of magnetic pole pairs and a second end of the series of magnetic pole pairs.

17. A system for position determination, comprising:
a first magnetic sensor that includes a first set of magnetic sensor elements aligned linearly along a direction of movement of the first magnetic sensor relative to a magnetic pole pair, wherein the first magnetic sensor is configured to:
generate a first pair of differential signals based on measurements from the first set of magnetic sensor elements, and
output the first pair of differential signals,
wherein a position of the first magnetic sensor is calculated based on a first angle of the first pair of differential signals; and
a second magnetic sensor that includes a second set of magnetic sensor elements aligned linearly along the direction of movement, wherein the second magnetic sensor is configured to:

generate a second pair of differential signals based on measurements from the second set of magnetic sensor elements, and output the second pair of differential signals;

wherein a position of the second magnetic sensor is calculated based on a second angle of the second pair of differential signals, and wherein the first magnetic sensor and the second magnetic sensor are positioned relative to one another to permit a position, along a series of magnetic pole pairs that include the magnetic pole pair, to be determined using the first pair of differential signals and the second pair of differential signals.

18. The system of claim 17, further comprising one or more processors configured to determine the position, along the series of magnetic pole pairs that include the magnetic pole pair, based on the first pair of differential signals and the second pair of differential signals.

19. The system of claim 17, further comprising memory to store a lookup table to be used to determine the position, along the series of magnetic pole pairs that include the magnetic pole pair, based on the first pair of differential signals and the second pair of differential signals.

20. The system of claim 17, wherein the first set of magnetic sensor elements and the second set of magnetic sensor elements are aligned linearly along a same axis or are aligned along parallel axes.

* * * * *